US012056465B2

(12) United States Patent
Klein et al.

(10) Patent No.: US 12,056,465 B2
(45) Date of Patent: Aug. 6, 2024

(54) VERIFYING THE CORRECTNESS OF A LEADING ZERO COUNTER

(71) Applicant: INTERNATIONAL BUSINESS MACHINES CORPORATION, Armonk, NY (US)

(72) Inventors: Michael Klein, Schoenaich (DE); Petra Leber, Ehningen (DE); Cedric Lichtenau, Stuttgart (DE); Stefan Payer, Stuttgart (DE); Kerstin Claudia Schelm, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 17/704,938

(22) Filed: Mar. 25, 2022

(65) Prior Publication Data
US 2023/0315394 A1 Oct. 5, 2023

(51) Int. Cl.
*G06F 7/74* (2006.01)
(52) U.S. Cl.
CPC .................... *G06F 7/74* (2013.01)
(58) Field of Classification Search
CPC .... G06F 7/74; G06F 7/49936; G06F 7/49942; G06F 5/01
USPC ........................................................ 708/211
See application file for complete search history.

(56) References Cited

U.S. PATENT DOCUMENTS

| 8,302,087 | B2 | 10/2012 | Ayachitula et al. |
| 9,311,177 | B2 | 4/2016 | Yao et al. |
| 2003/0105786 | A1* | 6/2003 | Athas ......................... G06F 7/74 708/203 |
| 2013/0262546 | A1* | 10/2013 | Shinomiya .............. G06F 7/483 708/495 |
| 2021/0182028 | A1 | 6/2021 | Exall et al. |

OTHER PUBLICATIONS

Anonymous, Method and apparatus for concurrent circuit reliability check for adaptive guard banding and improved RAS performance, IBM, An IP.com Prior Art Database Technical Disclosure, IP.com No. IPCOM000226248D, IP.com Electronic Publication Date: Mar. 25, 2013, 5 pages.
Aws, Hybrid Cloud with AWS, URL: https://aws.amazon.com/hybrid/?nc1=h_ls, printed Feb. 3, 2022, 19 pages.
(Continued)

*Primary Examiner* — Andrew Caldwell
*Assistant Examiner* — Carlo Waje
(74) *Attorney, Agent, or Firm* — Randy Emilio Tejeda (57) ABSTRACT

Verifying the correctness of a leading zero counter, including: generating, based on an input value comprising a plurality of digits, a first bit vector, wherein each entry of the first bit vector indicates whether a corresponding digit of the input value is equal to zero; calculating, based on the first bit vector, a leading zero count for the input value; generating a bit mask comprising a number of leading ones equal to the leading zero count; generating a second bit vector comprising a one at a same index as a first occurring zero in the bit mask; and verifying the leading zero count based on the first bit vector and one or more of the bit mask and the second bit vector.

20 Claims, 7 Drawing Sheets

(56) References Cited

OTHER PUBLICATIONS

IBM, IBM Cobol for Linux on x86, URL: https://www.ibm.com/products/cobol-compiler-linux-x86/details, printed Feb. 3, 2022, 12 pages.

Phil De Valence, Migrating a Mainframe to AWS in 5 Steps with Astadia, AWS Partner Network (APN) Blog, URL: https://aws.amazon.com/blogs/apn/migrating-a-mainframe-to-aws-in-5-steps/, dated Mar. 23, 2018, 6 pages.

Steuart et al., Coming Soon: The AWS Mainframe Migration Competency, AWS Partner Network (APN) Blog, URL: https://aws.amazon.com/blogs/apn/coming-soon-the-aws-mainframe-migration-competency/, dated Dec. 3, 2020, 4 pages.

International Search Report and Written Opinion, PCT/EP2023/057127, dated Jun. 16, 2023, 10 pages.

Milenkovic et al., Modular Design of Fast Leading Zeros Counting Circuit, Journal of Electrical Engineering, vol. 66, No. 6, 2015, DOI: https://doi.org/10.2478/jee-2015-0054, dated Jan. 1, 2016, 5 pages, Section 2-4.

Seidel et al., On the Design of Fast IEEE Floating-Point Adders, Proceedings 15th IEEE Symposium on Computer Arithmetic. ARITH-15 2001, IEEE, DOI: 10.1109/ARITH.2001.930118, Date Added to IEEE Xplore: Aug. 7, 2022, 11 pages.

Wolfgang et al., Computer Architecture: Complexity and Correctness—Chapter 2: Basics, Springer, dated Mar. 31, 2022, 56 pages, section 2, 3.

\* cited by examiner

FIG. 1

| 0 | 0 | 0 | 0 | 0 | 0 | 0 | 0 | ... | 0 | 1 | 1 | 0 | 0 | 1 | 0 | 0 |
|---|---|---|---|---|---|---|---|---|---|---|---|---|---|---|---|---|
| 0 | 1 | 2 | 3 | 4 | 5 | 6 | 7 | ... | 120 | 121 | 122 | 123 | 124 | 125 | 126 | 127 |

| 0 | 0 | ... | 1 | 1 |
|---|---|---|---|---|
| 0 | 1 | ... | 30 | 31 |

| 1 | 1 | 1 | 1 | 0 | ... | 0 | 0 | 0 | 0 | 0 |
|---|---|---|---|---|-----|----|----|----|----|----|
| 0 | 1 | 2 | 3 | 4 | ... | 27 | 28 | 29 | 30 | 31 |

| 0 | 0 | 0 | 0 | 1 | 0 | ... | 0 | 0 | 0 | 0 |
|---|---|---|---|---|---|-----|----|----|----|----|
| 0 | 1 | 2 | 3 | 4 | 5 | ... | 28 | 29 | 30 | 31 |

VERIFYING THE CORRECTNESS OF A LEADING ZERO COUNTER

BACKGROUND

Field of the Invention

The field of the invention is data processing, or, more specifically, methods, apparatus, and products for verifying the correctness of a leading zero counter.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Leading zero counters are difficult to test using existing testing methodologies. Accordingly, where a leading zero counter is faulty, the fault may be undetected or not detected until after deployment. A faulty leading zero counter may overestimate or underestimate the number of leading zeroes in a number, causing functional errors.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Various computing operations include counting a number of leading zero digits in a number such as a hexadecimal number. For example, in order to output an internally formatted number to a human-readable format that excludes leading zeroes, the number of leading zero digits may be counted so that they may be removed. To do so, a leading zero counter circuit may be employed on a chip or other device.

Leading zero counters are difficult to test using existing testing methodologies. Accordingly, where a leading zero counter is faulty, the fault may be undetected or not detected until after deployment. A faulty leading zero counter may overestimate or underestimate the number of leading zeroes in a number, causing functional errors.

Figure 1:
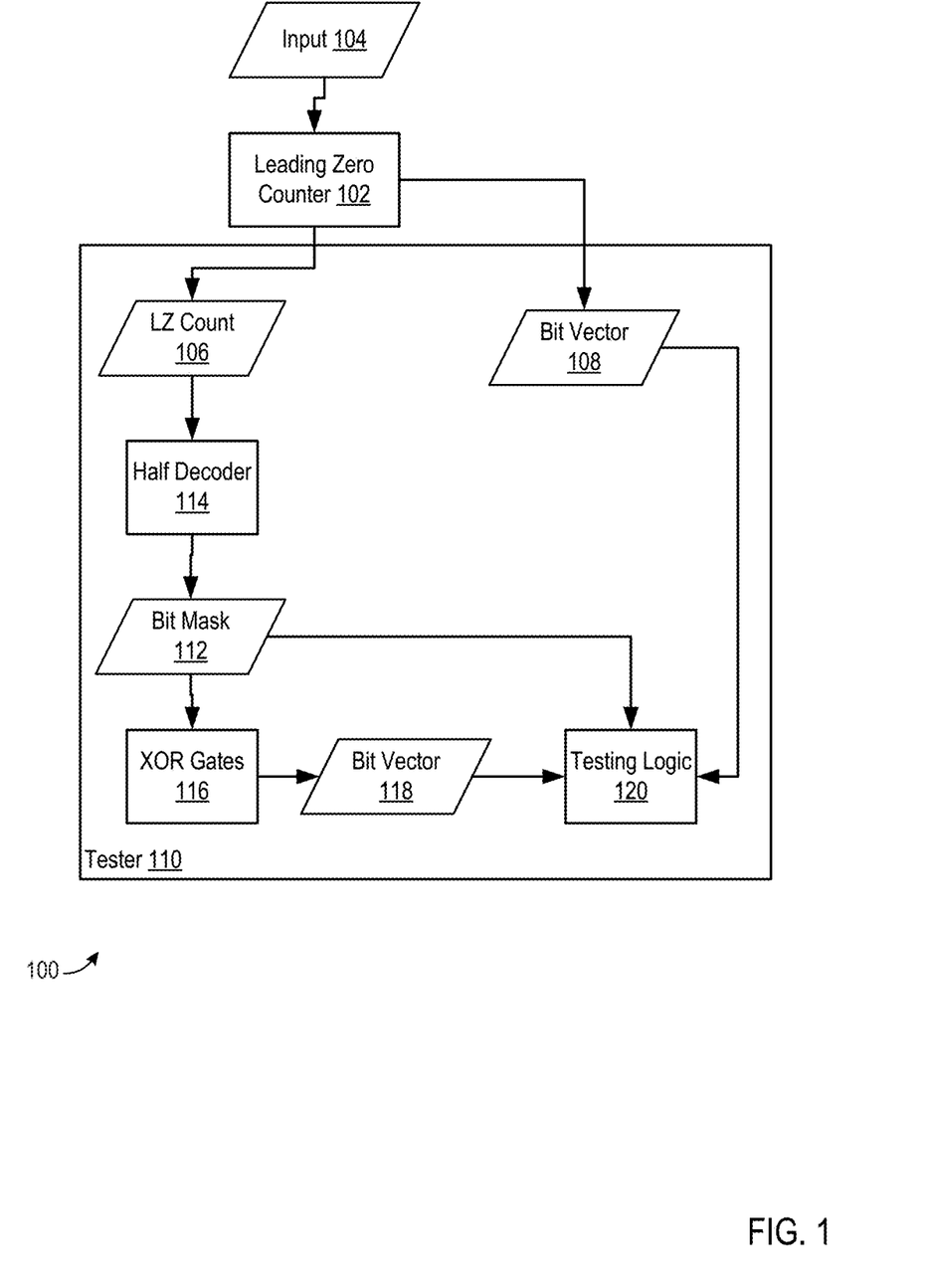
FIG. 1 shows a block diagram of an example chip for verifying the correctness of a leading zero counter according to some embodiments of the present disclosure.

To this end, exemplary methods, apparatus, and products for verifying the correctness of a leading zero counter in accordance with the present invention are described with reference to the accompanying drawings, beginning with FIG. 1. FIG. 1 shows a block diagram of an example system 100 for verifying the correctness of a leading zero counter according to some embodiments of the present disclosure. The system 100 includes a leading zero counter 102. The leading zero counter 102 accepts, as input 104, an encoded number such as a hexadecimal number. The leading zero counter 102 outputs a leading zero (LZ) count 106 indicating a number of leading zero in the input 104 counted by the leading zero counter 102. The number of leading zeros is a number of digits of the number where each bit of the digit is a zero. For example, within the context of a hexadecimal input 104, each digit is four bits. Thus, each leading zero includes four zero bits.

Figure 2A:
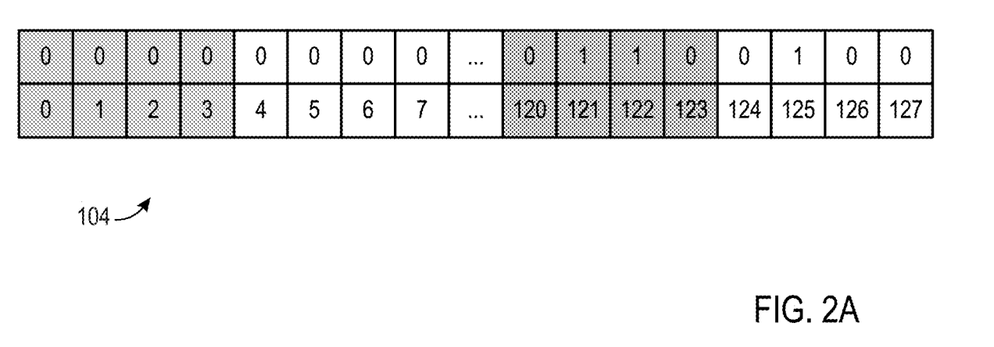
FIG. 2A shows an example input hexadecimal value for calculating a leading zero count according to some embodiments of the present disclosure.
Figure 2B:
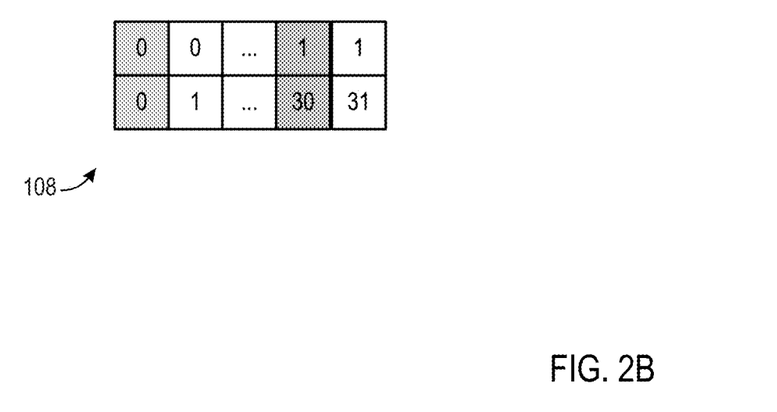
FIG. 2B shows an example bit vector for calculating a leading zero count according to some embodiments of the present disclosure.

In some embodiments, in order to calculate the LZ count 106, the leading zero counter 102 applies, for each digit of the input 104, a bitwise OR to the bits of that digit. Consider the example one hundred- and twenty-eight-bit hexadecimal input 104 shown in FIG. 2A. The leading zero counter 102 performs a four-bit OR operation thirty-two times, once for each of the thirty-two digits of the input 102. The result is a bit vector 108, with each entry in the bit vector 108 corresponding to a result of a bitwise OR operation for a corresponding digit. Continuing with the example above, as shown in FIG. 2B, the bit vector 108 would include thirty-two entries corresponding to the thirty-two digits of the input 102. Each entry would then include the result of a four-bit OR operation for the bits of the corresponding digit. After generating the bit vector 108, the leading zero counter 102 calculates the LZ count 106 by counting the number of leading zeroes in the bit vector 108. The LZ count 106 may be encoded, for example, as a binary coded vector of bits.

The system 100 also includes a tester 110 that verifies the accuracy of the LZ count 106 produced by the leading zero counter 104. The tester 110 may be implemented, for example, as a device or apparatus coupled to the leading zero counter 102 configured to receive the LZ count 106 and bit vector 108 from the leading zero counter 102. As another example, the tester 110 may be implemented as logic or circuitry mounted to a same device, apparatus, substrate, and the like as the leading zero counter 102. As an example, in some embodiments, the tester 110 is configured to determine whether the LZ count 106 is too large, too small, or neither. The tester 110 accepts, as input, the LZ count 106 from the leading zero counter 102 and the bit vector 108 generated by the leading zero counter 102 used to calculate the LZ count 106.

Figure 3A:
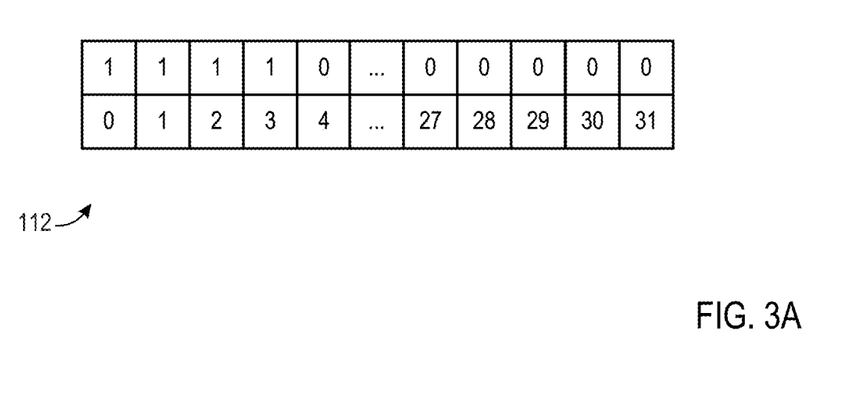
FIG. 3A an example bit mask for verifying the correctness of a leading zero counter according to some embodiments of the present disclosure.

To do so, the tester 110 generates, from the LZ count 106, a bit mask 112 including a number of leading ones equal to the LZ count 106. For example, as shown in FIG. 3A, assuming an LZ count 106 of four, the bit mask 112 will include four leading ones with the remainder being zeroes. The size of the bit mask 112 is equal to a number of digits in the input 102. For example, for a thirty-two digit input 102, the bit mask 112 includes thirty-two bits. In some embodiments, generating the bit mask 112 includes providing the LZ count 106 to a half decoder 114 that outputs the bit mask 112.

Figure 3B:
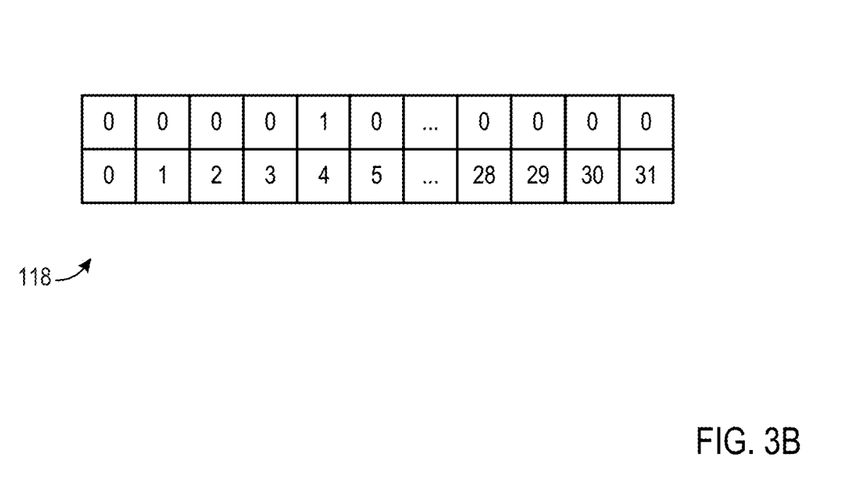
FIG. 3B an example bit vector for verifying the correctness of a leading zero counter according to some embodiments of the present disclosure.

The tester 110 then generates, from the bit mask 112, another bit vector 118. The bit vector 118 is all zeroes with a one at an index corresponding to the first zero in the bit mask 112. For example, turning to FIG. 3B, assuming a bit mask 112 with four leading ones, the bit vector 118 would include four leading zeroes and a one at the fifth entry. In some embodiments, the tester 110 generates the bit vector 118 by performing a bitwise exclusive-OR (XOR) operation on each pair of bits in the bit mask 112. For example, each entry in the bit vector 118 is generated by providing a corresponding entry in the bit mask 112 and the entry preceding the corresponding entry into a corresponding XOR gate 116 of a plurality of XOR gates 116. As the first entry of the bit mask 112 has no preceding entry, the first entry of the bit vector 118 may be generated by providing the first entry of the bit mask 112 with a one.

The tester 110 then verifies the LZ count 106 using testing logic 120. As an example, in some embodiments, the tester 110 determines whether the LZ count 106 is too large by performing a bitwise AND on the bit vector 108 (e.g., the bit vector 108 generated by the leading zero counter 102) and the bit mask 112. The result of this bitwise AND should be all zeroes. If not, the LZ count 106 is too large.

As an example, assume a bit vector 108 of "00001101011 . . . " having four leading zeroes and a correct LZ count 106 of four. Further assume a bit mask 112 of "11110000 . . . " having four leading ones based on the LZ count 106. The result of a bitwise AND would equal all zeroes, indicating that the result is not too large. Instead, assume the same bit vector 108 but an LZ count 106 of five, resulting in a bit mask of "11111000 . . . ." The result of this bitwise AND operation would equal "00001000 . . . ." As the result is not all zeroes, this indicates that the LZ count 106 is too large.

In some embodiments, the tester 110 determines whether the LZ count 106 is too small by performing a bitwise AND operation on the bit vector 108 and the bit vector 118 (e.g., the bit vector 118 having a one corresponding to the first zero in the bit mask 112." The result of this bitwise AND operation should not be all zeroes. Otherwise, the result is too small. For example, assume a bit vector 108 of "00001101011 . . . " having four leading zeroes and a correct LZ count 106 of four. Further assume a bit vector 118 of "000010000 . . . ." A bitwise AND of the bit vector 108 and the bit vector 118 would equal "0000100000." As the result is not all zeroes, the LZ count 106 is not too small. Instead, assume the same bit vector 108 but an incorrect LZ count 106 of three, resulting in a bit vector 118 of "0001000 . . . ." The result of this bitwise AND operation would be all zeroes, indicating that the LZ count 106 is too small.

One skilled in the art will appreciate that the approach employed by the tester 110 is highly efficient, only requiring a half decoder 114 and XOR gates 116 in order to generate the bit mask 112 and bit vector 118, respectively. Moreover, one skilled in the art 110 will appreciate that the approaches described herein may be used on all types of leading zero counters 102.

Verifying the correctness of a leading zero counter in accordance with the present application is generally implemented with computers, that is, with automated computing machinery. For further explanation, therefore, FIG. 4 sets forth a block diagram of computing machinery including an exemplary computer 400 configured for verifying the correctness of a leading zero counter according to certain embodiments. The computer 400 of FIG. 4 includes at least one computer processor 402 or 'CPU' as well as random access memory 404 (RAM') which is connected through a high speed memory bus 406 and bus adapter 408 to processor 402 and to other components of the computer 400.

Stored in RAM 404 is an operating system 410. Operating systems useful in computers configured for verifying the correctness of a leading zero counter according to certain embodiments include UNIX™, Linux™, Microsoft Windows™, and others as will occur to those of skill in the art. The operating system 410 in the example of FIG. 4 is shown in RAM 404, but many components of such software typically are stored in non-volatile memory also, such as, for example, on data storage 412, such as a disk drive.

Figure 4:
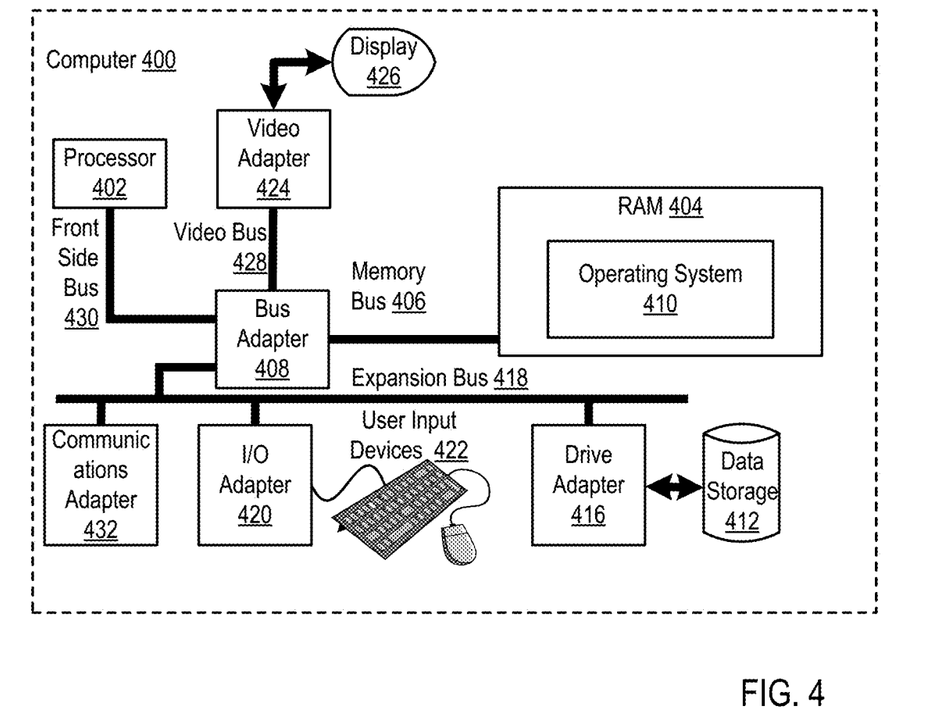
FIG. 4 shows a block diagram of an example computer for verifying the correctness of a leading zero counter according to some embodiments of the present disclosure.

The computer 400 of FIG. 4 includes disk drive adapter 416 coupled through expansion bus 418 and bus adapter 408 to processor 402 and other components of the computer 400. Disk drive adapter 416 connects non-volatile data storage to the computer 400 in the form of data storage 412. Disk drive adapters useful in computers configured for verifying the correctness of a leading zero counter according to certain embodiments include Integrated Drive Electronics ('IDE') adapters, Small Computer System Interface (SCSI') adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 400 of FIG. 4 includes one or more input/output ('I/O') adapters 420. I/O adapters implement user-oriented input/output through, for example, software drivers and computer hardware for controlling output to display devices such as computer display screens, as well as user input from user input devices 422 such as keyboards and mice. The example computer 400 of FIG. 4 includes a video adapter 424, which is an example of an I/O adapter specially designed for graphic output to a display device 426 such as a display screen or computer monitor. Video adapter 424 is connected to processor 402 through a high speed video bus 428, bus adapter 408, and the front side bus 430, which is also a high speed bus.

The exemplary computer 400 of FIG. 4 includes a communications adapter 432 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for verifying the correctness of a leading zero counter according to certain embodiments include modems for wired dial-up communications, Ethernet (IEEE 802.3) adapters for wired data communications, and 802.11 adapters for wireless data communications.

Figure 5:
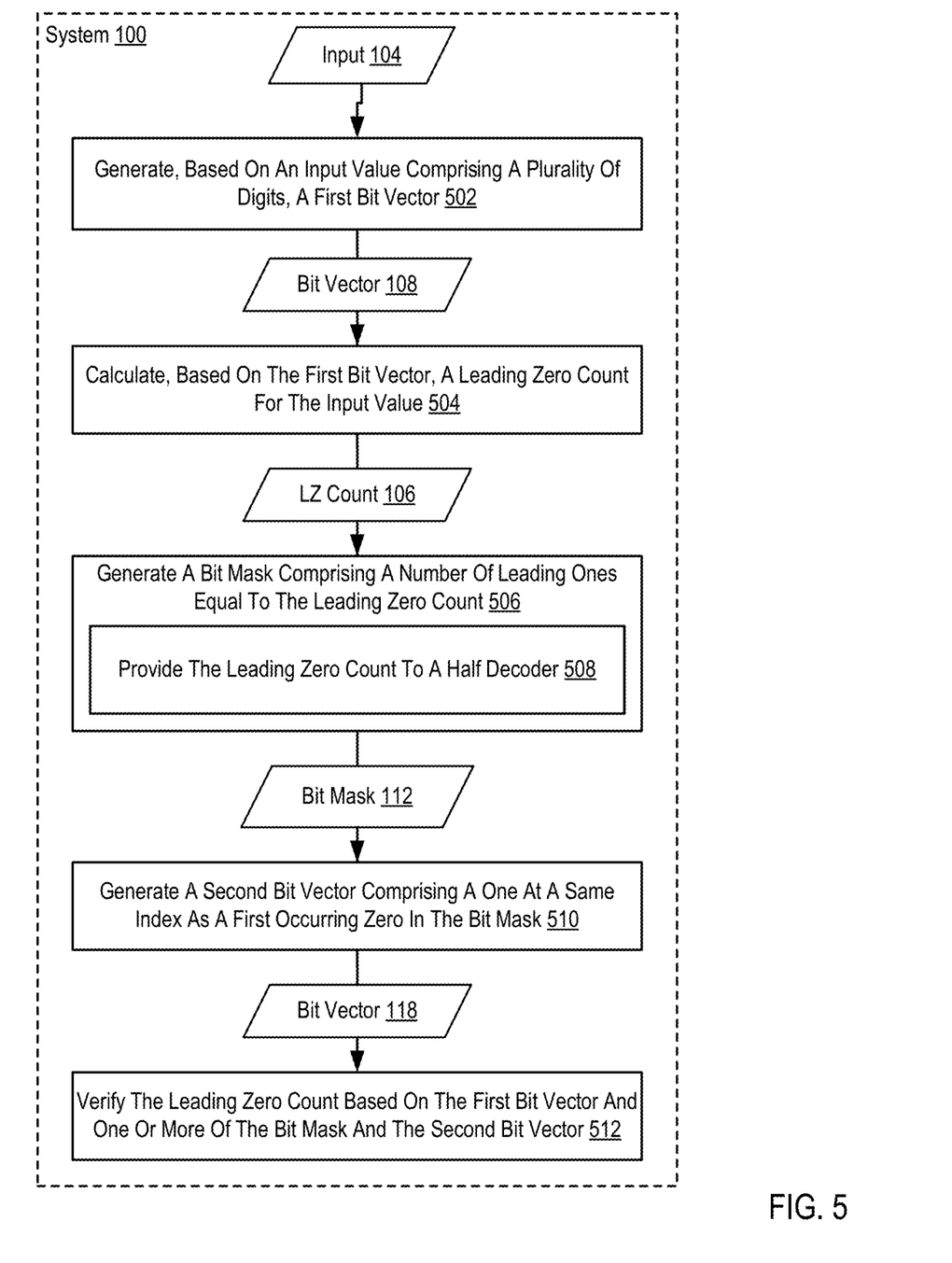
FIG. 5 shows a flowchart of an example method for verifying the correctness of a leading zero counter according to some embodiments of the present disclosure.

For further explanation, FIG. 5 shows a flowchart of an example method for verifying the correctness of a leading zero counter according to some embodiments of the present disclosure. The method of FIG. 5 may be performed, for example, by a system 100 as shown in FIG. 1. The method of FIG. 5 includes generating 502 (e.g., by a leading zero counter 102), based on an input value (e.g., an input 104) comprising a plurality of digits, a first bit vector 108. The first bit vector 108 includes a number of entries equal to a number of digits in the input 104, with each entry if the first bit vector 108 indicating whether or not the corresponding digit is all zeroes. Thus, where an entry of the first bit vector 108 is equal to zero, the corresponding digit is zero. Where an entry of the first bit vector 108 is one, the corresponding digit is not zero.

In some embodiments, the first bit vector 108 is calculated by applying, for each digit of the input 104, a bitwise OR to the bits of that digit. Consider the example one hundred- and twenty-eight-bit hexadecimal input 104 shown in FIG. 2A. The leading zero counter 102 performs a four-bit OR operation thirty-two times, once for each of the thirty-two digits of the input 102. The result is a bit vector 108, with each entry in the bit vector 108 corresponding to a result of a bitwise OR operation for a corresponding digit. Continuing with the example above, as shown in FIG. 2B, the bit vector 108 would include thirty-two entries corresponding to the thirty-two digits of the input 102. Each entry would then include the result of a four-bit OR operation for the bits of the corresponding digit.

The method of FIG. 5 also includes calculating 504 (e.g., by the leading zero counter 102), based on the first bit vector 108, a leading zero count (e.g., an LZ count 106) for the input value. As an example, the LZ count 106 for the input 104 is calculated by calculating the number of leading zeroes in the first bit vector 108.

The method of FIG. 5 also includes generating 506 (e.g., by a tester 110) a bit mask 112 comprising a number of ones equal to the LZ count 106. For example, as shown in FIG. 3A, assuming an LZ count 106 of four, the bit mask 112 will include four leading ones with the remainder being zeroes. The size of the bit mask 112 is equal to a number of digits in the input 102. For example, for a thirty-two digit input 102, the bit mask 112 includes thirty-two bits. In some embodiments, generating the bit mask 112 includes providing 508 the LZ count 106 to a half decoder 114.

The method of FIG. 5 also includes generating 510 (e.g., by the tester 110) a second bit vector 118 comprising a one at a same index as a first occurring zero in the bit mask 112. For example, turning to FIG. 3B, assuming a bit mask 112 with four leading ones, the bit vector 118 would include four leading zeroes and a one at the fifth entry. In some embodiments, the tester 110 generates the bit vector 118 by performing a bitwise exclusive-OR (XOR) operation on each pair of bits in the bit mask 112. For example, each entry in the bit vector 118 is generated by providing a corresponding entry in the bit mask 112 and the entry preceding the corresponding entry into a corresponding XOR gate 116 of a plurality of XOR gates 116. As the first entry of the bit mask 112 has no preceding entry, the first entry of the bit vector 118 may be generated by providing the first entry of the bit mask 112 with a one.

The method of FIG. 5 also includes verifying 512 (e.g., by the tester 110) the LZ count 106 based on the first bit vector 108 and one or more of the bit mask 112 and the second bit vector 118. As will be described in further detail below, verifying 512 the LZ count 106 may determine whether the LZ count 106 is too large based on the first bit vector 108 and the bit mask 112. As will also be described in further detail below, verifying 512 the LZ count 106 may determine whether the LZ count 106 is too small based on the first bit vector 108 and the second bit vector 118.

Figure 6:
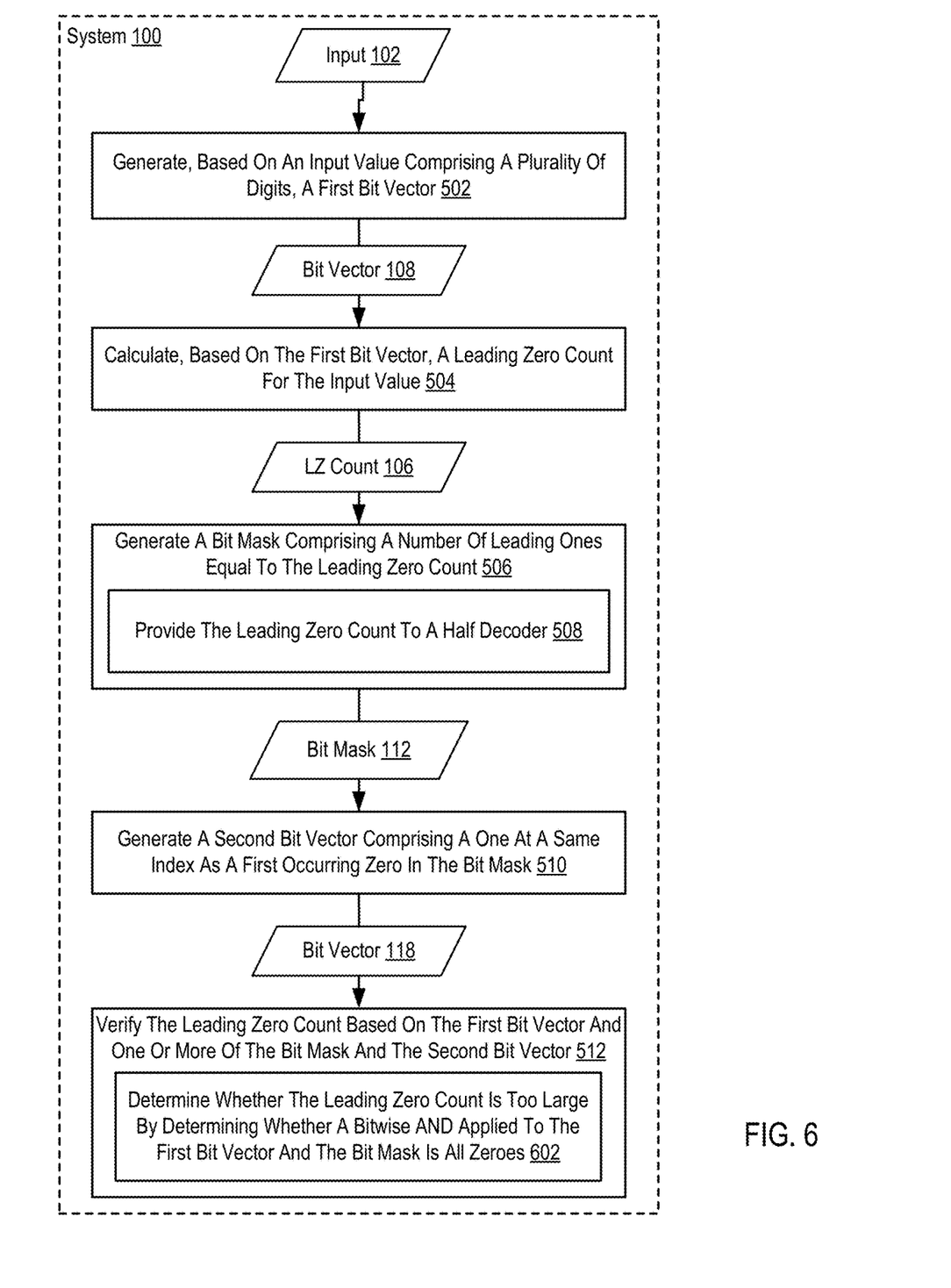
FIG. 6 shows a flowchart of another example method for verifying the correctness of a leading zero counter according to some embodiments of the present disclosure.

For further explanation, FIG. 6 sets forth a flowchart of another example method for verifying the correctness of a leading zero counter according to some embodiments of the present disclosure. The method of FIG. 6 is similar to FIG. 5 in that the method of FIG. 6 include generating 502, based on an input value (e.g., an input 102) comprising a plurality of digits, a first bit vector 108; calculating 504, based on the first bit vector 108, a leading zero count (e.g., an LZ count 106) for the input value; generating 506 a bit mask 112 comprising a number of leading ones equal to the LZ count 106 by providing 508 the LZ count 106 to a half decoder 114; generating 510 a second bit vector 118 comprising a one at a same index as a first occurring zero in the bit mask 112; and verifying 512 the LZ count 106 based on the first bit vector 108 and one or more of the bit mask 112 and the second bit vector 118.

The method of FIG. 6 differs from FIG. 5 in that verifying 512 the LZ count 106 based on the first bit vector 108 and one or more of the bit mask 112 and the second bit vector 118 includes determining 602 whether the LZ count 106 is too large by determining whether a bitwise AND applied to the first bit vector 108 and the bit mask 112 is all zeroes. Where the result of the bitwise AND is all zeroes, the LZ count 106 is not too large. Where the result of the bitwise AND is not all zeroes, the LZ count 106 is too large.

As an example, assume a bit vector 108 of "00001101011 . . . " having four leading zeroes and a correct LZ count 106 of four. Further assume a bit mask 112 of "11110000 . . . ." having four leading ones based on the LZ count 106. The result of a bitwise AND would equal all zeroes, indicating that the result is not too large. Instead, assume the same bit vector 108 but an LZ count 106 of five, resulting in a bit mask of "11111000 . . . ." The result of this bitwise AND operation would equal "00001000 . . . ." As the result is not all zeroes, this indicates that the LZ count 106 is too large.

Figure 7:
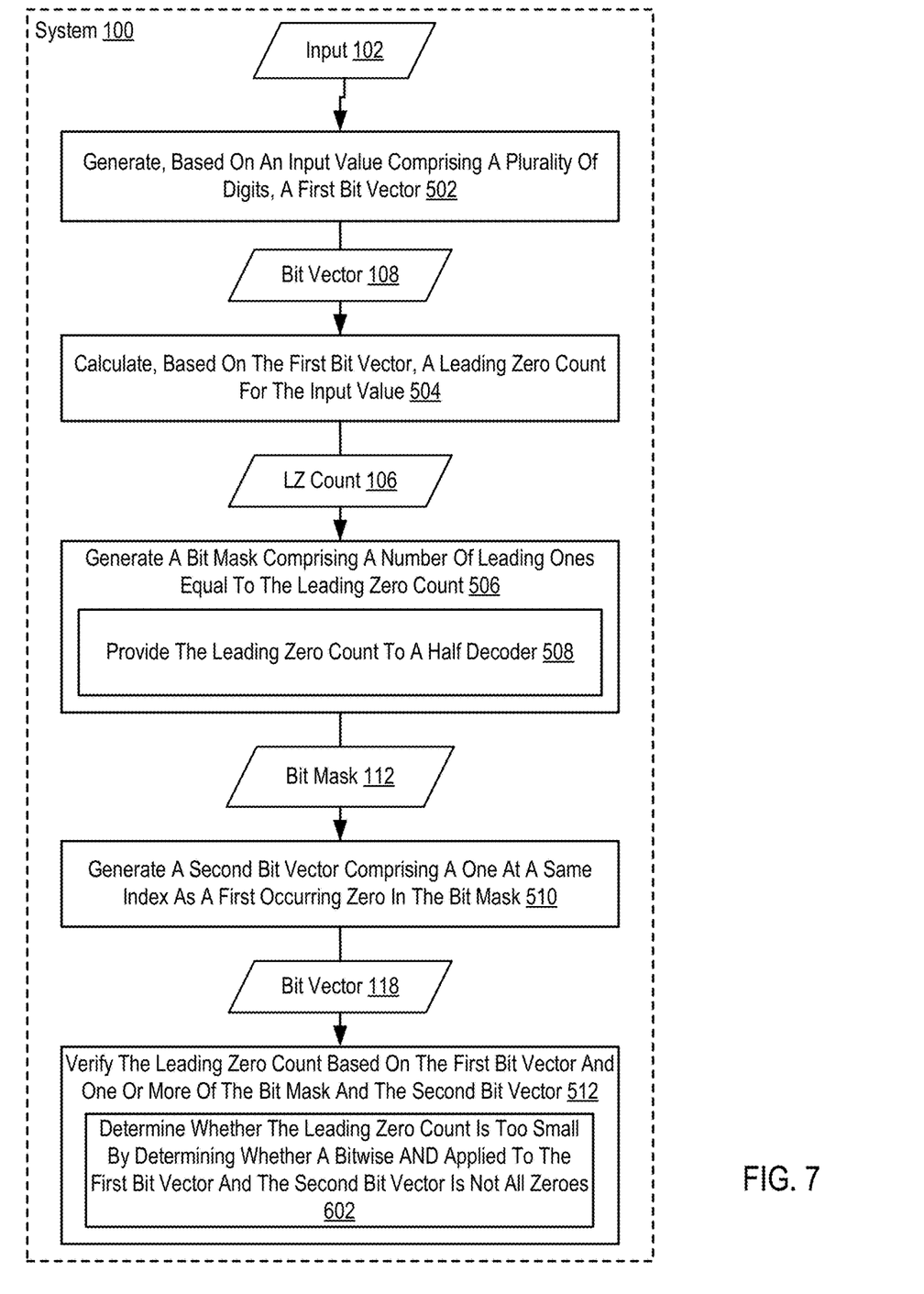
FIG. 7 shows a flowchart of another example method for verifying the correctness of a leading zero counter according to some embodiments of the present disclosure.

For further explanation, FIG. 7 sets forth a flowchart of another example method for verifying the correctness of a leading zero counter according to some embodiments of the present disclosure. The method of FIG. 7 is similar to FIG. 5 in that the method of FIG. 7 include generating 502, based on an input value (e.g., an input 102) comprising a plurality of digits, a first bit vector 108; calculating 504, based on the first bit vector 108, a leading zero count (e.g., an LZ count 106) for the input value; generating 506 a bit mask 112 comprising a number of leading ones equal to the LZ count 106 by providing 508 the LZ count 106 to a half decoder 114; generating 510 a second bit vector 118 comprising a one at a same index as a first occurring zero in the bit mask 112; and verifying 512 the LZ count 106 based on the first bit vector 108 and one or more of the bit mask 112 and the second bit vector 118.

The method of FIG. 7 differs from FIG. 5 in that verifying 512 the LZ count 106 based on the first bit vector 108 and one or more of the bit mask 112 and the second bit vector 118 includes determining 702 whether the LZ count 106 is too small by determining whether a bitwise AND applied to the first bit vector 108 and the second bit vector 118 is not all zeroes. Where the result of the bitwise AND is not all zeroes, the LZ count 106 is not too small. Where the result of the bitwise AND is all zeroes, the LZ count 106 is too small.

For example, assume a bit vector 108 of "00001101011 . . . " having four leading zeroes and a correct LZ count 106 of four. Further assume a bit vector 118 of "000010000 . . . ." A bitwise AND of the bit vector 108 and the bit vector 118 would equal "0000100000." As the result is not all zeroes, the LZ count 106 is not too small. Instead, assume the same bit vector 108 but an incorrect LZ count 106 of three, resulting in a bit vector 118 of "0001000" The result of this bitwise AND operation would be all zeroes, indicating that the LZ count 106 is too small.

In view of the explanations set forth above, readers will recognize that the benefits of verifying the correctness of a leading zero counter according to embodiments of the present invention include improved performance of a computing system by efficiently testing for the correctness of a leading zero counter.

Exemplary embodiments of the present invention are described largely in the context of a fully functional computer system for verifying the correctness of a leading zero counter. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of verifying the correctness of a leading zero counter, the method comprising:
   generating, based on an input value to a leading zero counter and comprising a plurality of digits, a first bit vector, wherein each entry of the first bit vector indicates whether a corresponding digit of the input value is equal to zero;
   calculating, by the leading zero counter based on the first bit vector, a leading zero count for the input value;
   generating, as an output by a half decoder and responsive to the leading zero count being an input to the half decoder, a bit mask comprising a number of leading ones equal to the leading zero count;
   generating, as an output by a plurality of exclusive OR (XOR) gates and responsive to the bit mask being an input to the plurality of XOR gates, a second bit vector comprising a one at a same index as a first occurring zero in the bit mask; and
   verifying, by testing logic including a number of AND gates, the leading zero count based on the first bit vector and one or more of the bit mask and the second bit vector as inputs into the testing logic.

2. The method of claim 1, wherein each entry of the first bit vector is calculated based on a bitwise OR applied to each bit of the corresponding digit of the input value.

3. The method of claim 1, wherein each digit is encoded using four bits.

4. The method of claim 1, wherein generating the bit mask comprises providing the leading zero count to the half decoder.

5. The method of claim 1, wherein generating the second bit vector comprises performing an XOR operation on each bit pair in the bit mask.

6. The method of claim 1, wherein verifying the leading zero count comprises determining whether the leading zero count is too large by determining whether a bitwise AND of the first bit vector and the bit mask is all zeroes.

7. The method of claim 1, wherein verifying the leading zero count comprises determining whether the leading zero count is too small by determining whether a bitwise AND of the first bit vector and the second bit vector is not all zeroes.

8. An apparatus for verifying the correctness of a leading zero counter, the apparatus comprising:
   a tester comprising a half decoder, a plurality of exclusive OR (XOR) gates, and testing logic, the tester configured to perform steps comprising:
      receiving a first bit vector for an input value and a leading zero count for the input value based on the first bit vector, wherein each entry of the first bit vector indicates whether a corresponding digit of the input value is equal to zero;
      generating, as an output by the half decoder and responsive to the leading zero count being an input to the half decoder, a bit mask comprising a number of leading ones equal to the leading zero count;
      generating, as an output by the plurality of XOR gates and responsive to the bit mask being an input to the plurality of XOR gates, a second bit vector comprising a one at a same index as a first occurring zero in the bit mask; and
      verifying, by the testing logic including a number of AND gates, the leading zero count based on the first bit vector and one or more of the bit mask and the second bit vector as inputs into the testing logic.

9. The apparatus of claim 8, wherein each entry of the first bit vector is calculated based on a bitwise OR applied to each bit of the corresponding digit of the input value.

10. The apparatus of claim 8, wherein each digit is encoded using four bits.

11. The apparatus of claim 8, wherein generating the bit mask comprises providing the leading zero count to the half decoder.

12. The apparatus of claim 8, wherein generating the second bit vector comprises performing an XOR operation on each bit pair in the bit mask.

13. The apparatus of claim 8, wherein verifying the leading zero count comprises determining whether the leading zero count is too large by determining whether a bitwise AND of the first bit vector and the bit mask is all zeroes.

14. The apparatus of claim 8, wherein verifying the leading zero count comprises determining whether the leading zero count is too small by determining whether a bitwise AND of the first bit vector and the second bit vector is not all zeroes.

15. A system for verifying the correctness of a leading zero counter, comprising:
a leading zero counter configured to perform steps comprising:
generating, based on an input value comprising a plurality of digits, a first bit vector, wherein each entry of the first bit vector indicates whether a corresponding digit of the input value is equal to zero; and
calculating a leading zero count for the first bit vector; and
a tester for the leading zero counter comprising a half decoder, a plurality of exclusive OR (XOR) gates, and testing logic including a number of AND gates, the tester configured to perform steps comprising:
generating, as an output by the half decoder and responsive to the leading zero count being an input to the half decoder, a bit mask comprising a number of leading ones equal to the leading zero count;
generating, as an output by the plurality of XOR gates and responsive to the bit mask being an input to the plurality of XOR gates, a second bit vector comprising a one at a same index as a first occurring zero in the bit mask; and
verifying, by the testing logic, the leading zero count based on the first bit vector and one or more of the bit mask and the second bit vector as inputs into the testing logic.

16. The system of claim 15, wherein each entry of the first bit vector is calculated based on a bitwise OR applied to each bit of the corresponding digit of the input value.

17. The system of claim 15, wherein generating the bit mask comprises providing the leading zero count to the half decoder.

18. The system of claim 15, wherein generating the second bit vector comprises performing an XOR operation on each bit pair in the bit mask.

19. The system of claim 15, wherein verifying the leading zero count comprises determining whether the leading zero count is too large by determining whether a bitwise AND of the first bit vector and the bit mask is all zeroes.

20. The system of claim 15, wherein verifying the leading zero count comprises determining whether the leading zero count is too small by determining whether a bitwise AND of the first bit vector and the second bit vector is not all zeroes.

* * * * *